United States Patent [19]

Dean

[11] Patent Number: 5,461,389
[45] Date of Patent: Oct. 24, 1995

[54] DIGITAL BEAMFORMING ARRAY

[75] Inventor: Michael Dean, Malvern, United Kingdom

[73] Assignee: The Secretary of State for Defence in Her Britannic Majesty's Government of the United Kingdom of Great Britain and Northern Island, London, England

[21] Appl. No.: 244,889

[22] Filed: Jun. 30, 1994

[30] Foreign Application Priority Data

Dec. 19, 1991 [GB] United Kingdom ............... 9126944

[51] Int. Cl.⁶ ............................................. H01Q 3/22
[52] U.S. Cl. ......................... 342/375; 342/372; 342/154
[58] Field of Search ............................. 342/375, 154, 342/157, 373, 372

[56] References Cited

U.S. PATENT DOCUMENTS

| | | | |
|---|---|---|---|
| 4,212,084 | 7/1980 | Poole | 367/118 |
| 4,544,927 | 10/1985 | Kurth et al. | 343/373 |
| 4,790,320 | 12/1988 | Perten et al. | 128/661.01 |
| 5,084,708 | 1/1992 | Champeau et al. | 342/377 |
| 5,203,335 | 4/1993 | Noujaim et al. | 128/661.01 |

FOREIGN PATENT DOCUMENTS

| | | |
|---|---|---|
| 0224014 | 6/1987 | European Pat. Off. . |
| 3114449 | 8/1991 | Japan . |

Primary Examiner—Thomas H. Tarcza
Assistant Examiner—Dao L. Phan
Attorney, Agent, or Firm—Nixon & Vanderhye

[57] ABSTRACT

A digital beamforming array for use in radar applications and particularly in radar applications that used phased array technology. The array receives an incoming signal at a plurality of sensor modules, converts them to intermediate frequency, and then converts the intermediate frequency signals to n-bit (preferably 1-bit) digital signals at an oversampling rate, where n is less than the number of bits required to represent the dynamic range of the intermediate frequency signal. The n-bit digital signals are then beamformed by altering their relative phases and combining them to form a resultant n-bit digital signal which is then converted to a digital signal of the number of bits required to represent the dynamic range of the intermediate frequency signal. An advantage of the present invention is that it reduces the complexity and thus the cost of the digitizing hardware required.

12 Claims, 3 Drawing Sheets

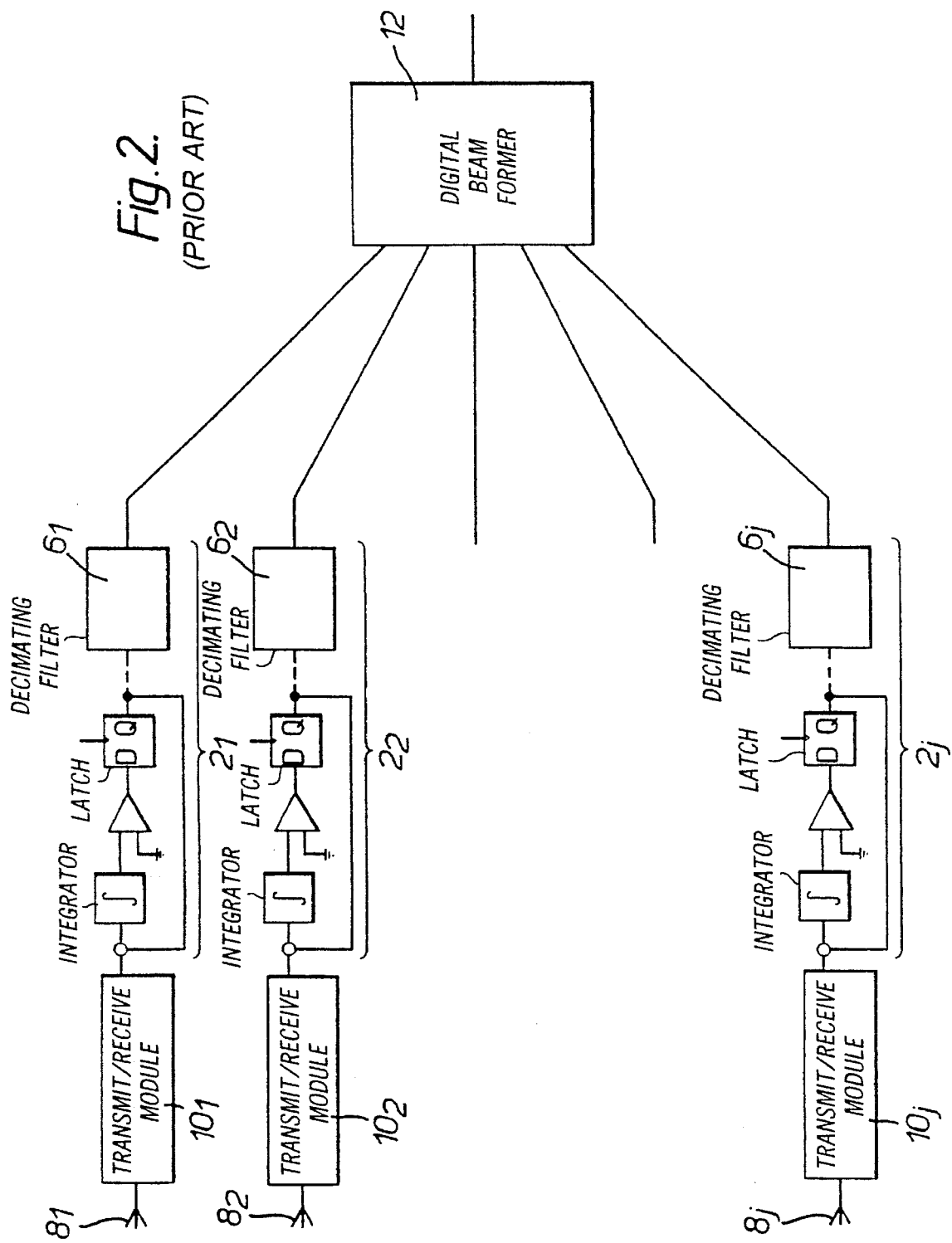

DIGITAL BEAMFORMING ARRAY

BACKGROUND OF THE INVENTION

1. Field of the Invention

This invention relates to a digital beamforming array for use in radar applications and in particular in radar applications that use phased array technology.

2. Discussion of Prior Art

In many radar applications there is increasing evidence that the next generation or sensors will use active phased array technology. Such sensors comprise an array of modules, each having its own independent transmitter and receiver. Electronically steered transmit and receive beams can be generated by suitable phasing of the input and output signals or the modules. This enables rapid beam steering without moving mechanical parts, giving enhanced potential for multi-mode operation and/or low cost implementation.

An important extension of active array technology is the technique of digital beamforming. Here each module has a dedicated analogue to digital converter and the beamforming process is accomplished in the digital domain. This enables multiple receive beams to be implemented without the need for many bulky analogue beamforming manifolds. This ability to realise multiple receive beams is vital if monopulse or other precision target bearing determination schemes are to be implemented. Also the ability to sample the output or each module independently allows the implementation of adaptive beamforming and super-resolution algorithms, which are currently reaching a high degree or maturity. Furthermore, the algorithmic nature of the beamforming process means that it is possible for variations in the phase and amplitude responses of individual modules to be calibrated out by software means.

Balanced against these advantages of digital beamforming is the significant sensor cost penalty that can result from the requirement that each module has its own analogue to digital converter and the potentially high cost of the signal processing hardware required to implement the digital beamforming algorithm.

SUMMARY OF THE INVENTION

The present invention provides a digital beamforming array which enables a significant reduction in complexity and cost and which retains all the advantages of digital beamforming mentioned above.

According to a first aspect of the present invention there is provided a digital beamforming array, comprising;

a plurality of sensor modules for receiving incoming radar signals and converting them to intermediate frequency signals, a plurality of linear digitising means, one for each module, for converting the intermediate frequency signals to n-bit digital signals at an oversampling rate, where n is less than the number of bits required to represent the dynamic range of the intermediate frequency signal, a beamforming means, for altering the relative phases of the n-bit signals and combining them to form a resultant digital signal, and decimating means for converting the resultant digital signal output from the beamforming means to a digital signal of the number of bits required to represent the dynamic range of the intermediate frequency signal.

A considerable reduction in digitizing hardware results from the present invention because only one decimating means is required per implemented beam, whereas in conventional digital beamforming arrays using oversampling analogue to digital convertors, one decimating means is required per sensor module. Thus, the decimating means can be a more costly high performance device without increasing the overall cost of the array significantly. This can allow higher degrees of oversampling to be performed, with the associated increase in dynamic range.

The beamforming process according to the present invention involves the combination of suitably phase shifted n-bit representations of the sensor module outputs. This would appear to involve high speed complex digital multiplications, which could to some extent negate the advantage gained by the reduction in digitising hardware.

However, in a preferred embodiment of the present invention the beamforming process can be implemented by a beamfoming means which comprises a plurality of time delays, one for each digitizing means, for time delaying the n-bit digital signals by predetermined amounts to obtain a set of appropriately time delayed signals and an adding means for adding the set of signals.

In a beamforming array according to the present invention the output of each digitizing means can be regarded as a representation of the output of the relevant sensor module. If the digitising means oversamples by a factor Q, then each n-bit output forms a series of discrete signals which represent the output of the relevant sensor module at intervals in phase of $2\pi/Q$. The beamforming process aims primarily to remove phase differences between received signals which result from the angle of incidence of a received beam on the spatially separated array of sensor modules. This process is generally carried out by altering the phase angles of the received signals relative to one another in a predetermined manner depending on the said angle of incidence. In this preferred embodiment of the present invention beamforming can be achieved simply by time delaying the n-bit outputs relative to one another, which is equivalent to delaying the outputs by multiples of $2\pi/Q$ in phase angle relative to one another and then adding the n-bit outputs so delayed. Therefore, this preferred embodiment of the present invention significantly reduces the cost and complexity of the signal processing hardware required to implement the beamforming process.

Preferably, the oversampling factor of the digitizing means, Q, is greater than 16 so that the relative differences in phase that can be introduced into the n-bit signals are small enough to allow accurate beamforming. More preferably the oversampling factor, Q, is greater than 32.

For applications where it is necessary to implement more than one receive beam, preferably more than one adding means is used and the plurality of time delay means are arranged to supply a set of appropriately time delayed signals to each adding means. Incident beams may arrive at the array from a spread of directions and so it may be necessary in some applications to implement the beams in a number of different directions within this spread. The present invention is easily adapted for this purpose because a different sets of signals, delayed in accordance with different angles of incidence, can be fed to each adding means. Clearly, there will be one decimating means associated with each adding means.

Preferably, each time delay means comprises a shift register with a number of elements and a means for tapping the output of the appropriate element of the shift register to obtain an appropriately time delayed signal, where each element of the shift register is able to store an n-bit number.

The n-bit numbers held in successive elements of the shift register are representations of the signal from the sensor module shifted in phase by $2\pi/Q$. Thus, by tapping a signal from the appropriate element of each shift register a set of signals with the appropriate relative phase changes made to them (in multiples of $2\pi/Q$) can be obtained. The use of the shift registers as time delay means enables a further reduction in the cost and complexity of the beamforming array according to the present invention.

In applications where the information flow rate allows, it is preferable to convert the intermediate frequency signal to a one-bit digital signal at the oversampling rate. Clearly, the rate of oversampling is greatest for a one-bit signal and so where the information flow is high the oversampling rate may exceed the capabilities of the digitizing hardware and so conversion to a one-bit signal is not possible. The advantage of a conversion to a one-bit digital signal is that it can be manipulated by simple hardware which can be cheap and reliable, for example one-bit shift registers and one-bit adders. Furthermore, in a conventional array with multi-bit analogue to digital converters for each module, the raw digital information would require a multi-pin connector to interface the data to the beamforming processor. Such connections are expensive and can be unreliable in applications where high vibrations are likely to be experienced. Such a connection can be avoided in this preferred embodiment of the present invention because the interface is made at one-bit level which does not require complex hardware. Also, if a wire-less connection is required a simple one-bit optical data link can be used.

More preferably, in the preferred embodiment where one-bit digital signals are used each linear digitizing means comprises the first part and the decimating means comprises the second part of a delta sigma analogue to digital converter. The decimating filter of a delta sigma converter performs an energy averaging process over portions of the one-bit stream from the first part of the converter. This process is linear, as is the process of beamforming, so the beamforming process can be performed on the one-bit data from the first part of the convertor, which beamformed data can then be averaged in the decimating filter. The advantages of using delta sigma converters are not lost by splitting the two parts of the converter in the present invention. These advantages are that sigma delta converters have a high dynamic range which is important in applications which require the operation of the beamforming array in high clutter and electronic interference environments. They also have the advantage of allowing low cost monolithic implementation. Alternatively, the linear digitizing means could utilise analogue to digital conversion using direct interpolation as described in U.S. Pat. No. 4,621,254, entitled "Apparatus and Method for Analogue to Digital Conversion".

In higher information flow applications the trade off between the number of bits and the rate of oversampling makes it is preferable to use a number of bits that is greater than 1. In such applications it is preferable for the linear digitizing means to comprise the first part and the decimating means to comprise the second part of a noise shaping analogue to digital converter.

The array according to the present invention implements an equal weighting to all of the signals from the sensor modules. In many applications the outputs from the sensor modules are required to be non-uniformly weighted, in order to improve the sidelobes of the resulting patterns. In such applications it is preferable to have a weighting means in the beamforming array for weighting the outputs of the sensor modules before they are combined.

According to a second aspect of the present invention there is provided a process for digitally beamforming a radar signal, comprising the steps of;

receiving the incoming radar signal at a plurality of points in space, and converting the plurality of signals produced therefrom to intermediate frequency, converting the intermediate frequency signals to n-bit digital signals at an oversampling rate, where n is less than the number of bits required to represent the dynamic range of the intermediate frequency signal, beamforming the n-bit digital signals by altering the relative phases of the signals and combining them to form a resultant digital signal, and converting the resultant digital signal to a digital signal of the number of bits required to represent the entire dynamic range of the intermediate frequency signal.

Preferably the process of beamforming comprises the steps of time delaying each of the n-bit signals by an appropriate amount and adding together the n-bit signals so delayed.

The process according to the second aspect of the present invention has the same advantages as are discussed above in relation to the first aspect of the present invention.

BRIEF DESCRIPTION OF THE DRAWINGS

Embodiments of the present invention will now be described by way of example only with reference to the following drawings in which:

FIG. 2 shows a conventional digitally beamformed array using delta sigma converters.

DETAILED DESCRIPTION OF PREFERRED EMBODIMENTS

Figure 1:
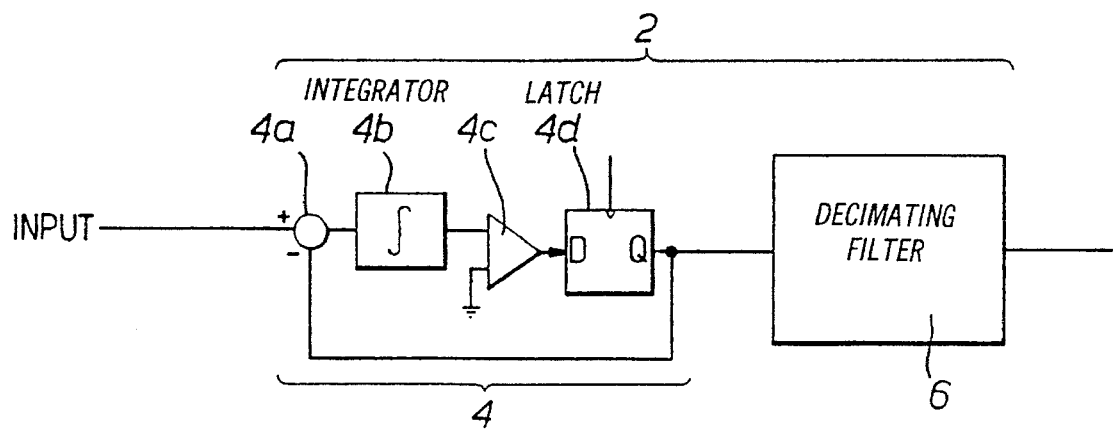
FIG. 1 shows a delta-sigma analogue to digital converter, that is used in digitally beamformed arrays.

Referring first to FIG. 1, the sigma delta converter 2 shown therein can be divided into two parts. The first part is an analogue one-bit sampling loop 4 and is a high speed one-bit analogue to digital converter which samples at a speed many times higher than the sampling rate necessary for the required signal bandwidth. The one-bit sampling loop comprises a subtracting means $4a$, an integrator $4b$, a comparator $4c$ (which compares an input signal with an analogue voltage reference level) and a latch circuit $4d$, connected in series in a loop. This produces an output from the latch circuit $4d$ which is a rapid stream of one-bit data at the oversampling rate. In order to produce multi-bit data at the required signal bandwidth, it is necessary to feed this data into the second part of the delta sigma converter, the decimating filter 6. The decimating filter 6 normally comprises a cascade of filters operating at successively lower sampling rates, culminating in the desired multi-bit output.

Referring now to FIG. 2, this shows a conventional digitally beamformed array comprising an array of j antennae $8_1$ to $8_j$ which are arranged in a straight line. The outputs from each antenna $8_1$ to $8_j$ are fed into respective transmit/ receive modules $10_1$ to $10_j$ which each have their own transmitting and receiving circuitry. The intermediate frequency outputs of the transmit/receive modules $10_1$ to $10_j$ are red into respective sigma delta converters $2_1$ to $2_j$, which operate as discussed above with reference to FIG. 1. The outputs from all the sigma delta convertors $2_1$ to $2_j$ are connected to a single digital beamformer 12.

The digitally beamformed array shown in FIG. 2 operates in the following way. When a beam is incident on the array of antennae $8_1$ to $8_j$ at an angle q to the array, the signals received by the antennae $8_1$ to $8_j$ are converted to intermediate frequency in the respective transmit receive modules $10_1$ to $10_j$. The intermediate frequency signals are then digitised by the sigma-delta converters $2_1$ to $2_j$. Then these digital representations of each of the n received signals are beamformed in the digital beamformer 12, to remove the differences in the phase between the signals, associated with a radar pulse incident at the said angle q. The signal output from the digital beamformer 12 can then be analysed to obtain information about any target that is located in the direction associated with the angle q. The array shown in FIG. 2 is complex and relatively expensive because one delta sigma converter is required for each module and the digital beamformer 12 is a complex signal processor which has to be able to carry out high speed complex multiplications on the multi-bit information from the converters.

Figure 3:
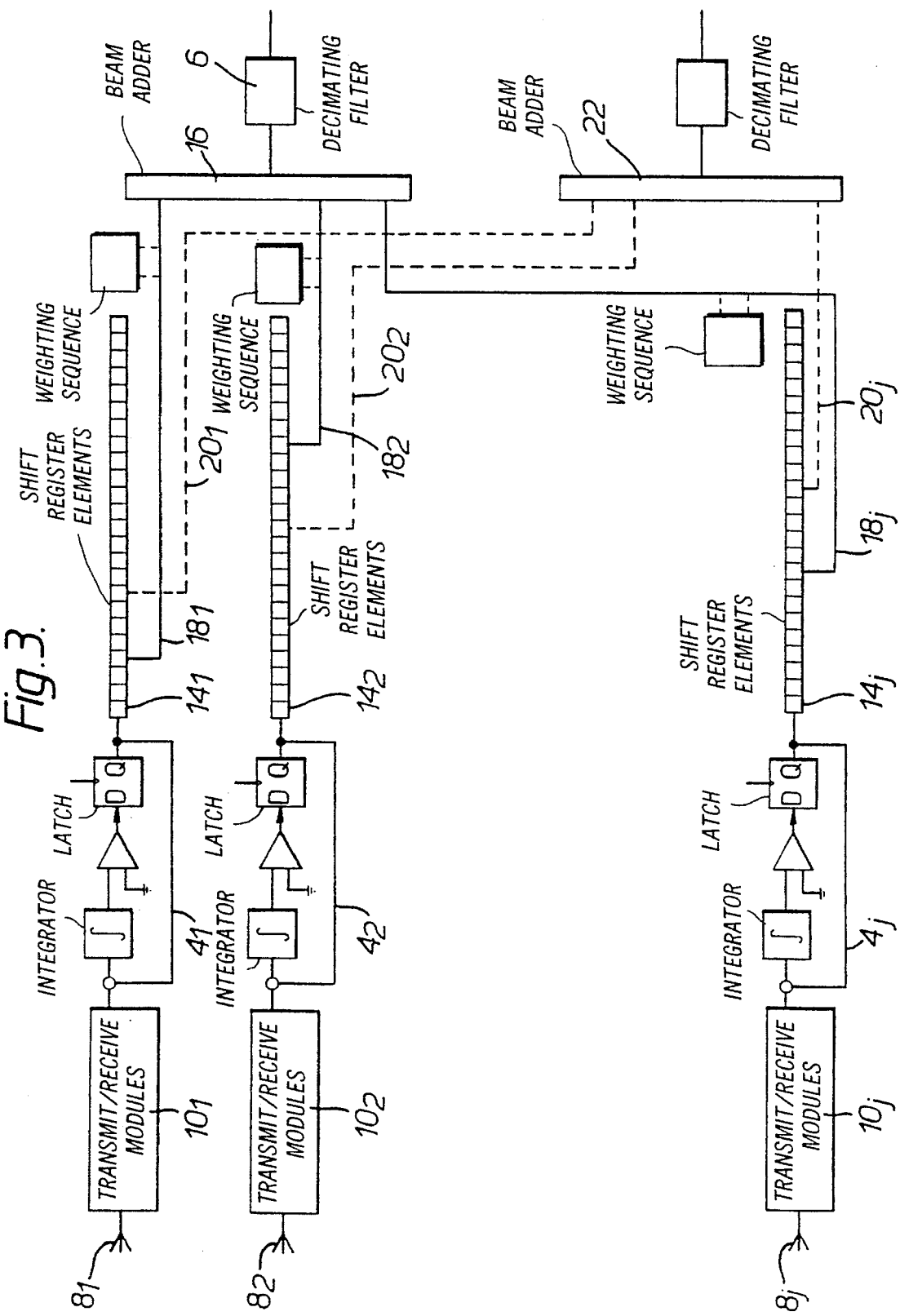
FIG. 3 shows a digitally beamformed array according to the present invention.

Referring now to FIG. 3 which shows a digitally beamformed array according to the present invention comprising an array of j antennae $8_1$ to $8_j$ which are arranged in a straight line, similarly to the array shown in FIG. 2. Also similar to the array shown in FIG. 2 are the transmit/receive modules $10_1$ to $10_j$. The intermediate frequency outputs of the transmit receive modules $10_1$ to $10_j$ are fed into the analogue one bit sampling loops $4_1$ to $4_j$ respectively which form the first half of a delta sigma converter 2, as discussed with reference to FIG. 1. The oversampled one-bit outputs of the sampling loops $4_1$ to $4_j$ can be regarded as representations of the outputs from the respective antennae $8_1$ to $8_j$. If the sampling loops $4_1$ to $4_j$ oversample by a factor Q, then successive oversampled outputs can be regarded as being phase shifted by a phase angle p, where $p=2\pi/Q$.

If Q is sufficiently large then the process of beamforming can be accomplished by simply adding together suitably time-delayed oversampled outputs of the sampling loops $4_1$ to $4_j$. Thus the outputs of the sampling loops are fed into shift registers $14_1$ to $14_j$ respectively, each of which is Q elements (each element is able to store a one-bit number) long and the outputs $18_1$ to $18_j$ of appropriate shift register elements are summed in a one-bit beam adder 16. The output of the beam adder 16 is then fed into a decimating filter 6. The output of the decimating filter 6 will be similar to the output of the beamformer 12 of FIG. 2 and can be analysed in a similar way to obtain target information. Further adjustment of the relative phases of the signals fed into the beam adder 16 can be obtained by adjusting the relative timing of the clock signals feeding the respective sampling loops $4_1$ to $4_j$. The output stream from the beam adder 16 will have up to j+1 discrete levels and so the common decimating filter 6 will have a more demanding task than the individual decimating filters $6_1$ to $6_j$ of FIG. 2.

Multiple beams, for example in monopulse applications, can be simply implemented by incorporating further adders, for example 22 in FIG. 3, fed from outputs $20_1$ to $20_j$ of other elements of the shift registers $14_1$ to $14_j$ as shown in FIG. 3 in dotted lines.

The digitally beamformed array described above in relation to FIG. 3 implements a uniform weighting across the elements that are added in the beam adders 16 (and 22), there being no provision for individually changing the weight given to the individual elements in the addition. In many applications the outputs of the sensor modules are required to be non-uniformly weighted, in order to improve the sidelobes of the resulting pattern. This can be achieved by either varying the analogue voltage reference levels of the individual convertors $4_1$ to $4_j$ or alternatively by multiplying the 1-bit oversampled outputs of the convertors $4_1$ to $4_j$ by a suitable 1-bit weighting sequence (shown in phantom line) prior to being fed to the adders 16 (and 22). This latter operation can be either applied before or after the shift registers $14_1$ to $14_j$ depending on whether the same or different weightings are required for the group of signals fed into the different adders 16 and 22.

Figure 4:
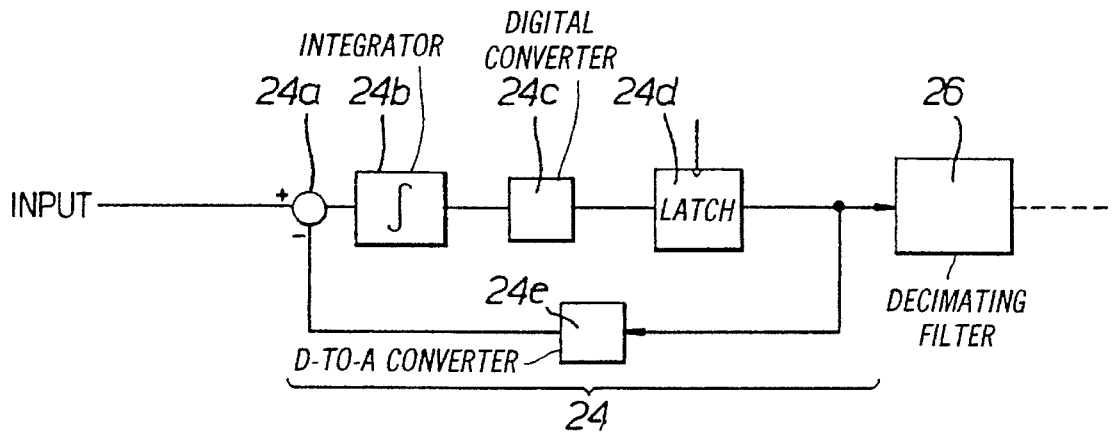
FIG. 4 shows a noise shaping analogue to digital converter which can be used, in place of the delta sigma converters, in the digitally beamformed array shown in FIG. 3, with slight modification to the array.

In some applications, for example, if a very fast information flow is required. The trade-off between the number of bits in the oversampled domain and the rate of oversampling is such that a lower sampling rate with more bits is preferred. A type of analogue to digital converter with this property is a noise shaping analogue to digital converter, such as is shown in FIG. 4. Such a converter can also be split into a sampling loop 24 and a decimating filter 26 in a similar manner to the sigma delta converter of FIG. 1. The sampling loop 24 comprises a subtraction means 24a, an integrator 24b, an n-bit analogue to digital converter 24c, a latch circuit 24d and a digital to analogue converter 24e, connected in series in a loop. The output of the latch circuit 24d is a series of n-bit representations of the signal from the sensor module at an oversampled rate. If the first part of a noise shaping analogue to digital converter, the sampling loop 24, is used to produce an output of n-bit data in place of each one of the sampling loops $4_1$ to $4_j$ in the array shown in FIG. 3 then n-bit element shift registers can be used instead of the 1-bit element shift registers $14_1$ to $14_j$ and an n-bit adder can be used in place of the one-bit adder 16. A suitable decimating filter 26 could then be used to convert the resulting data to the number of bits required to represent the entire dynamic range of the intermediate frequency signal.

I claim:

1. A digital beamforming array, comprising;

a plurality of sensor modules for receiving incoming radar signals and converting them to intermediate frequency signals, a plurality of linear digitizing means, one for each sensor, for converting the intermediate frequency signals to n-bit digital signals at an oversampling rate, where n is a number less than a number of bits required to represent the dynamic range of the intermediate frequency signal, a beamforming means, for altering the relative phases of the n-bit signals and combining them to form a resultant digital signal, and decimating means for converting the resultant digital signal output from the beamforming means to a digital signal of the number of bits required to represent the dynamic range of the intermediate frequency signal.

2. A digital beamforming array according to claim 1 wherein the beamforming means comprises a plurality of time delays, one for each digitizing means, for time delaying the n-bit digital signals by predetermined amounts to obtain a set of appropriately time delayed signals and at least one adding means for adding the set of signals.

3. A digital beamforming array according to claim 1 wherein the factor by which the digitizing means oversamples, Q, is greater than 16.

4. A digital beamforming array according to claim 2 wherein said at least one adding means is more than one adding means and the plurality of time delay means comprise a means for supplying a set of appropriately time delayed signals to each adding means.

5. A digital beamforming array according to claim 2 wherein each time delay means comprises a shift register with a number of elements which are each able to store an n-bit number and a means for tapping the output of the appropriate element of a shift register to obtain an appropriately time delayed signal.

6. A digital beamforming array according to claim 1 wherein n is 1.

7. A digital beamforming array according to claim 6 wherein each linear digitizing means comprises a first part and the decimating means comprises a second part, said first part and said second part comprising a delta signal analogue to digital converter.

8. A digital beamforming array according to claim 1 wherein n is greater than 1.

9. A digital beamforming array according to claim 8 wherein each linear digitizing means comprises a first part and the decimating means comprises a second part, said first part and said second part comprising a noise shaping analogue to digital converter.

10. A digital beamforming array according to claim 1 wherein the array additionally comprises a weighting means for weighting the outputs of the sensor modules before they are combined.

11. A process for digitally beamforming a radar signal, comprising the steps of;

receiving the incoming radar signal at a plurality of points in space and converting the plurality of signals produced therefrom to intermediate frequency signals, converting the intermediate frequency signals to n-bit digital signals at an oversampling rate, where n is less than the number of bits required to represent the dynamic range of the intermediate frequency signal, beamforming the n-bit digital signals by altering the relative phases of the signals and combining them to form a resultant digital signal, and converting the resultant digital signal to a digital signal of the number of bits required to represent the entire dynamic range of the intermediate frequency signal.

12. A process for digitally beamforming a radar signal according to claim 11 wherein the beamforming comprises the steps of time delaying each of the n-bit signals by an appropriate amount and adding together the n-bit signals so delayed.

* * * * *